(12) United States Patent
Sung (10) Patent No.: US 8,147,165 B2
(45) Date of Patent: Apr. 3, 2012

(54) ARTIFICIAL GROUND REEF

(76) Inventor: Oh-Yong Sung, Seoul (KR)

(*) Notice: Subject to any disclaimer, the term of this patent is extended or adjusted under 35 U.S.C. 154(b) by 0 days.

(21) Appl. No.: 13/082,237

(22) Filed: Apr. 7, 2011

(65) Prior Publication Data

US 2011/0250017 A1 Oct. 13, 2011

(30) Foreign Application Priority Data

Apr. 8, 2010 (KR) .......................... 10-2010-0032112

(51) Int. Cl.
*E02B 3/04* (2006.01)
*A01K 69/00* (2006.01)
(52) U.S. Cl. ................ 405/25; 405/24; 405/29; 405/30; 119/221
(58) Field of Classification Search .................... 405/24, 405/25, 29, 30; 119/221; 47/1.4, 1.01 R, 47/59 R, 63, 64
See application file for complete search history.

(56) References Cited

U.S. PATENT DOCUMENTS

| | | | | |
|---|---|---|---|---|
| 4,997,311 A | * | 3/1991 | Van Doren | 405/30 |
| 5,438,797 A | * | 8/1995 | Lendel | 47/82 |
| 6,962,130 B1 | * | 11/2005 | Kennedy | 119/221 |

FOREIGN PATENT DOCUMENTS

| | | | |
|---|---|---|---|
| JP | 2005-348659 | | 12/2005 |
| KR | 20-0195063 | | 9/2000 |
| KR | 100572069 B1 | | 4/2006 |
| KR | 762820 B1 | * | 10/2007 |
| KR | 100894325 B1 | | 4/2009 |

* cited by examiner

*Primary Examiner* — David Bagnell
*Assistant Examiner* — Kyle Armstrong
(74) *Attorney, Agent, or Firm* — Robert D. Atkins; Patent Law Group: Atkins & Associates, P.C.

(57) ABSTRACT

An artificial ground reef has an attached implanting body to allow seaweed to readily attach and inhabit the artificial ground reef. The artificial ground reef has a main body having an upper member and lower member. Seawater flows in all directions through a plurality of through-holes on a lower part of the lower member. A detachment groove is formed on a plurality of locations of the upper face of the main body. An implanting body has a lower part detachably connected to the detachment groove. The implanting body is separated from the main body and connected detachably to the detachment groove of the main body when seaweed is attached and inhabiting the outer periphery. The main body and implanting body are porous concrete to aid with attachment and inhabitation of the seaweed.

12 Claims, 8 Drawing Sheets

FIG. 7

ARTIFICIAL GROUND REEF

CLAIM OF FOREIGN PRIORITY

The present application claims priority to Korean Patent Application No. 10-2010-0032112, Apr. 8, 2010, which is hereby incorporated by reference in its entirety.

FIELD OF THE INVENTION

Embodiments of the invention relate to an artificial ground reef, and more particularly, to an artificial ground reef which may be made of porous concrete and to which an implanting body for seaweed being attached into the ground reef to be implanted is detached wherein the seaweed can easily attached into and inhabited in the artificial ground reef due to concrete porosity, and further the attached and inhabited seaweed may be implanted to other places using the implanting body, implementing offshore farming of fish, shellfish and seaweed.

BACKGROUND OF THE INVENTION

Generally, an artificial ground reef is a kind of artificial structure which may be arranged under the sea for forming habitats for various aquatic life such as fish, shellfish and seaweed, and which has been used to protect a fishing ground from drag nets or anchovy tow nets having large fishing capability and further to provide spawning ground and shelter for various fish and shellfish, fostering fish a source.

The artificial ground reef is typically classified as an immersed-arrangement type in which a structure is placed on the ocean floor surface or a float arrangement type in which the structure is moored under the sea. Meanwhile, in the prior art, various ground reefs such as waste-ship ground reef or waste-car ground reef have been used, including an assembled ground reef in which polyethylene resin or waste tire as waste material is made as a predetermined shape, however, a ground reef using such waste material has been disfavored because of ocean environmental contamination.

Here, there have been known two kinds of the immersed-arrangement ground reef among various ground reefs wherein one is a rectangular-shaped artificial ground reef, a framework of which is formed as hexahedron shape using concrete or fiber glass reinforced plastic (FRP), and the other is a hemispherical-shaped artificial ground reef in which flow passage for fish movement is formed on a hemispherical body. For arrangement of these ground reefs the rectangular-shaped and hemispherical-shaped artificial ground reefs are loaded on a barge and transported to a desired ocean region, and then these artificial ground reefs are installed to undersea using a crane tool on the barge, fostering a habitation place, spawning ground and shelter for various aquatic live such as fish, shellfish or seaweed.

However, referring to the rectangular or hemispherical-shaped artificial ground reef according to the prior art, since each ground reef is made as a simple configuration, various fish, shellfish and seaweed have difficulty in taking root and growing on a surface of the ground reef and thus even if shelter or spawning ground for fish is provided by arranging the artificial ground reef under the sea, the rooting of shellfish and seaweed which may become feed or shelter for fish is taken slowly, and further their individual numbers are very small. Accordingly, a primary object of the ground reef such as offshore farming is difficult to achieve.

Additionally, unit volume per one artificial rectangular ground reef corresponds to about 8 $m^3$, and when about 100 units of the artificial ground reefs are arranged in a stacked manner on an undersea floor made of poor soil ground such as sandy soil, sandy and muddy soil (a soil ground mixed with sand and mud in which mud component is about 70-90% or less), or muddy soil (a soil ground having mud component of greater than 90%), the artificial ground reefs corresponding to lower 30% thereof are sunk into the sea floor to an extent of 0.3 m, 0.5 m, 1.0 m and 1.5 m or so and thus ground reef function per unit artificial ground reef on the floor is decreased to 5%, 12%, 15% and 23% in sequence. Accordingly, the artificial ground reef arranged under the sea floor made of sandy soil, sandy and muddy soil or muddy soil lacks efficiency.

Meanwhile, in the case of the hemispherical-shaped artificial ground reef, when it is arranged as one layer on a sea floor surface of a shore having a shallow water level, the hemispherical-shaped artificial ground reef sinks into the sea floor made of poor soil ground and further it may be displaced from an initial location due to high sea or tide direction. In particular, under the artificial ground reef installation business enforcement and management code, which was revised on June 2002, the artificial ground reef can be installed legally on shore waters having water level of within 10 m for business and thus a need of development for a novel artificial ground reef exists, avoiding the displacement caused from the high sea and tide direction and inducing rapid attachment thereon of various shellfish and seaweed, which primarily inhabit the sea shore, and efficiently achieving offshore farming.

SUMMARY OF THE INVENTION

Embodiments of the invention are proposed to solve the aforementioned drawbacks of the prior art, and one object of the invention relates to providing an artificial ground reef to which seaweed is easily attached thereto and inhabits therein and the attached and inhabited seaweed is efficiently implanted to other places such as implanting for offshore farming.

Another object of the invention relates to providing an artificial ground reef through which water contamination caused from the artificial ground reef itself can be avoided and filtering for contaminants is performed, thus purifying the water.

Another object of the invention relates to providing an artificial ground reef through a lower part of which seawater can pass to induce seawater and through which a clean inhabiting environment for seaweed is created and furthermore excess immersing and inversion due to high seas and tide direction can be avoided.

To achieve the aforementioned objectives, according to one embodiment of the invention, the artificial ground reef comprises a main body including an upper member and a lower member and provided with a plurality of through-holes on a lower part of the lower member, through which seawater flows in all directions, a detachment groove formed on a plurality of locations of the upper face of the main body, and an implanting body, a lower part of which is detachably connected to the detachment groove and which is separated from the main body and detachably connected to detachment groove of other main body when seaweed is attached and inhabited on outer periphery thereof, wherein the main body and the implanting body are made of porous concrete.

The porous concrete is made by mixing broken stone (gravel), zeolite and cement in a void percentage range of 10-300, and the upper surface of the upper member is inclined convexly toward an inner center thereof.

At this time, the upper member includes at least more than one of a first groove formed horizontally on outer periphery thereof, the lower member includes at least more than one of a second groove formed horizontally on outer periphery and the main body includes more than one fixing groove to fix a bar for winding nursery line, which are provided on a plurality of locations of upper outer periphery thereof.

Additionally, the upper member includes an upper flat surface for lamination provided on a plurality of locations of upper outer periphery thereof, the lower member includes a lower flat surface for lamination, corresponding to the upper flat surface for lamination, formed on a plurality of locations of upper inner peripheral thereof.

The main body includes a through-hole formed vertically through a center thereof.

Meanwhile, the implanting body includes recessed grooves formed on both sides of outer periphery and further a through-opening formed through vertically a center thereof.

According to the artificial ground reef of the present invention, seaweed may be attached to and inhabited easily on the reef since the main body and the implanting body are made of porous concrete and further the attached and inhabited seaweed S may be implanted briefly to other place using the implanting body, easily implementing offshore farming.

Since the main body and the implanting body are fabricated with porous concrete made by mixing zeolite and broken stone (gravel) in a void percentage range of 10-30%, contaminants may be filtered and water is not contaminated without using iron bar, benefiting water purification.

Additionally, since seawater may flow vertically and in all directions through the through-holes on the lower member and the through-openings on the main body, deposits that accumulate on a lower part of the artificial ground reef are avoided and further prevents the artificial ground reef from excessive immersion and inversion caused from high sea and tide direction.

At this time, seaweed may easily be attached to the implanting body due to a protruded inclined surface and the attached seaweed may contact with flowing seawater and grow quickly in a short time period.

Furthermore, effective habitat, shelter and spawning place for fish and shellfish are provided to foster a clean inhabiting environment, making a shore provided with the artificial ground reef as a fishing ground within a short time period.

It is to be understood that both the foregoing general description and the following detailed description are exemplary and explanatory and are intended to provide further explanation of embodiments of the invention as claimed.

DETAILED DESCRIPTION OF THE DRAWINGS

Preferred embodiments of an artificial ground reef will be described in detail referring to the accompanying drawings. However, it has to be understood that embodiments of the invention are not limited to the preferred embodiments described hereafter.

Figure 1:
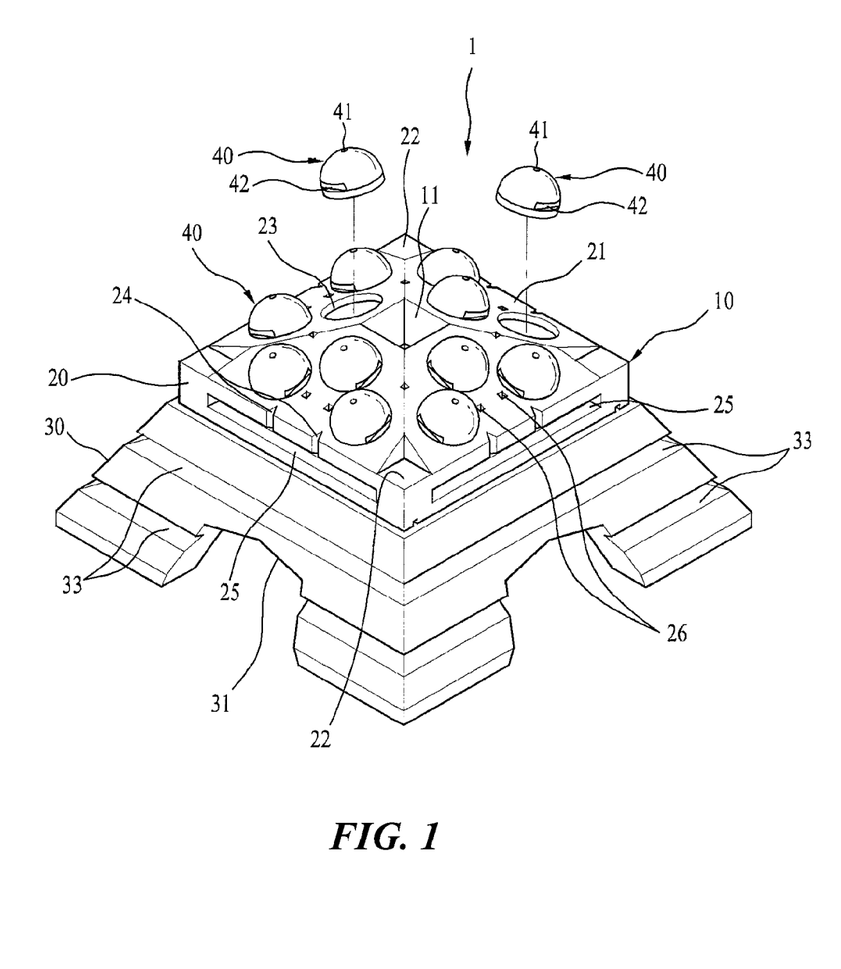
FIG. 1 is an exploded-perspective view of an artificial ground reef according to one embodiment of the present invention.
Figure 2:
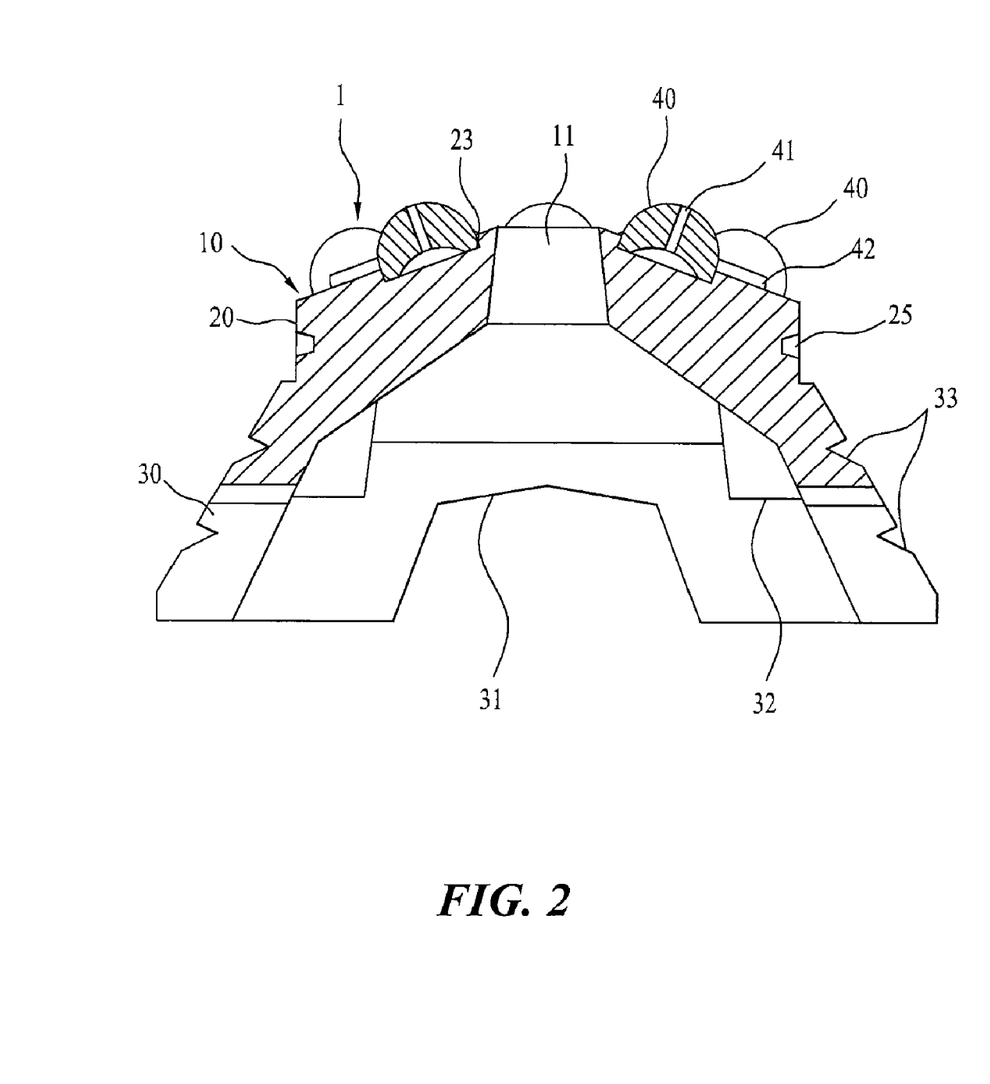
FIG. 2 is a sectional view of an artificial ground reef according to one embodiment of the present invention.
Figure 3:
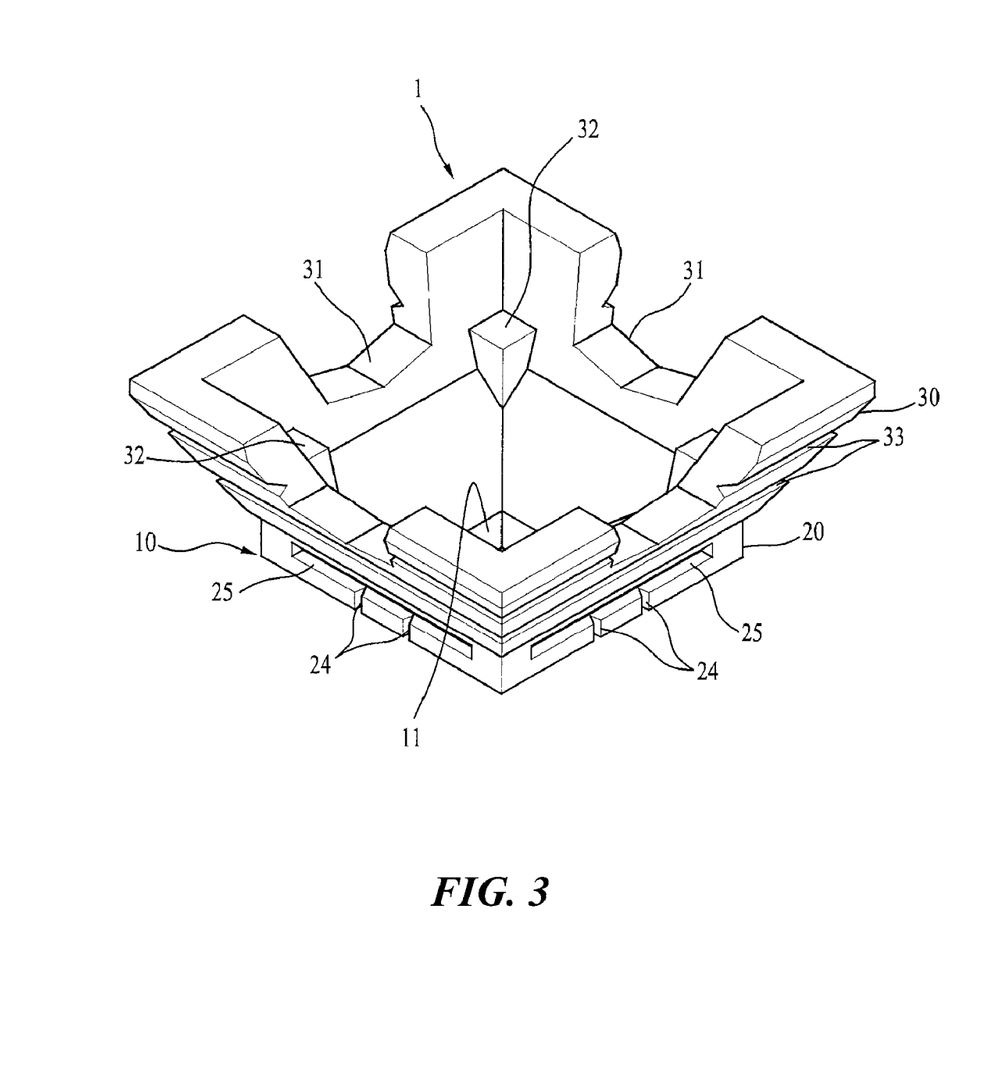
FIG. 3 is a perspective view showing a lower part of an artificial ground reef according to one embodiment of the present invention
Figure 4:
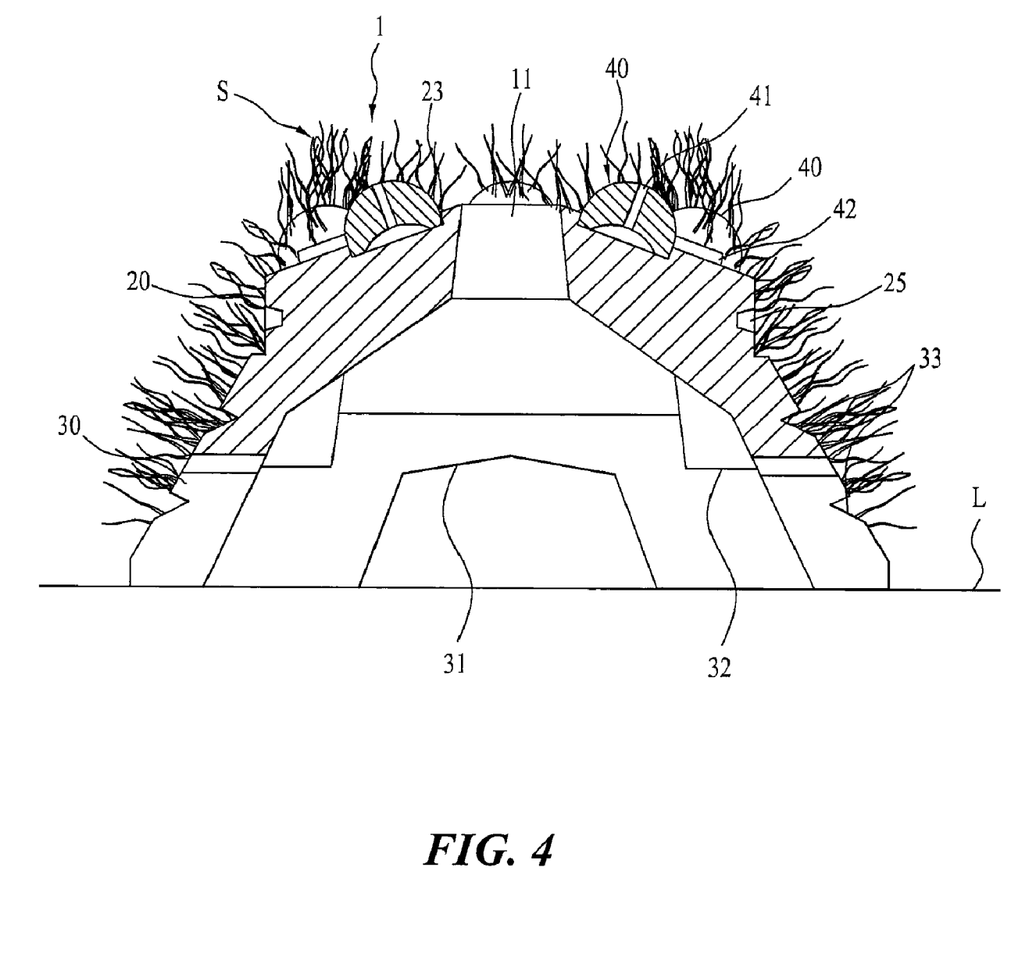
FIG. 4 is a perspective view showing an arrangement site of an artificial ground reef according to one embodiment of the present invention.

FIG. 1 is an exploded-perspective view of an artificial ground reef, FIG. 2 is a sectional view of an artificial ground reef, FIG. 3 is a perspective view showing a lower part of an artificial ground reef, and FIG. 4 is a perspective view showing an arrangement site of an artificial ground reef.

As shown in FIGS. 1-4, the artificial ground reef 1 having an upper member 20 and a lower member 30 includes a main body 10 provided with a plurality of through-holes 31 on a lower part of the lower member 30, through which seawater may flow in all directions, a detachment groove 23 provided on several upper locations of the upper member 30 of the main body 10, and an implanting body 40, a lower part of which may be detachably connected to the detachment groove 23 and which may be separated from the detachment groove 23 and implanted to different detachment grooves 23 of other main body 10 when seaweed S is attached to and inhabited on an outer periphery of the implanting body, wherein the main body 10 and the implanting body 40 are made of porous concrete.

First, the main body 10 includes an upper member 20 shaped as a rectangular box, and a lower member 30 which is extended obliquely downward from each lower edge of the upper member 20 and supports the main body 10. Here, a plurality of through-holes 31 is formed on a lower part of the lower member 30 wherein seawater may flow freely in all direction on a lower part of the main body 10, through the through-hole 31. At this time, the lower member 30 is configured in a trapezoidal shape of upper-narrow lower-wide wherein the inclined angle is about 60°, relieving immersion of the main body 10 into soil ground of the sea floor and avoiding displacement thereof.

Meanwhile, even though the main body 10 is configured in a rectangular shape in the specification and drawings, it has to be understood that it may be formed in various shapes such as circular, elliptical and polygonal, not limited to rectangular, or other shapes that may fall within a scope of the present invention as defined by the attached claims.

Additionally, an inclined surface 21 protruding convexly inward is provided on an upper surface of the upper member 20 and further a through-opening 11 is formed vertically on a center of the inclined surface wherein deposits or precipitates run and fall to the outer periphery of the upper member 20 along the inclined surface 21, and not accumulated thereon. In particular, the deposits or precipitates are avoided being accumulated on the lower part of the main body 10 through seawater running through the through-hole 31. In addition, the deposits are further avoided being accumulated on the inclined surface 21 since seawater can flow freely through the through-opening 11.

Furthermore, a detachment groove 23 is provided as in a circular shape on several locations of the inclined surface 21 and to which an implanting body 40, which will be described below, is detachably connected.

Here, through the inclined surface 21 is formed protruded convexly inward, it may be formed concavely toward inner center direction or in plan surface. These simple modifications fall within a scope of the present invention.

When the implanting body 40 is connected to the detachment groove 23, the implanting body 40 may be inclined based on the protruded inclined surface 21 and thus high sea and tide may run smoothly over the implanting body wherein flow effects of the high sea and tide can be decreased, avoid inversion of the implanting body 40 and allowing for the seaweed S to be attached easily and grown. That is, the seaweed attached to the implanting body 40 may grow rapidly with facing much flowing seawater and absorbing many nutrients.

Meanwhile, the detachment groove 23 is not limited to a circular shape, as shown in the drawings, and may be formed in various shapes such as an ellipse or a polygon. However, the shape of the detachment groove 23 has to conform to the shape of the implanting body 40 and further these simple modifications of the detachment groove 23 and the implanting body 40 may fall within a scope of the present invention. Here, it is shown that the seaweed may be attached to and inhabited on the main body 10 as well as the implanting body 40.

Further, an upper flat face for lamination 22 is provided on several outer periphery locations on upper side of the upper member 20 and a lower flat face for lamination 32 corresponding to the upper flat surface for lamination 22 is provided on several inner peripheral locations on lower side of the lower member 30 wherein when the main body 10 is fabricated and stored, or transported, the main body 10 may be laminated vertically firmly through robust contact between the upper flat face for lamination 22 provided on the main body 10 of a lower layer and the lower flat face for lamination 32 provided on the main body 10 of an upper layer. At this time, the upper flat face for lamination 22 may be preferably formed as a horizontal flat face on four upper outer periphery corners of the upper member 20 and the lower flat face for lamination 32 may be preferably formed as a horizontal flat face on four upper inner peripheral corners of the lower member 30. Additionally, the upper flat face for lamination 22 and the lower flat face for lamination 32 may be formed with inclined faces and further locations for forming them may be varied, which are considered to fall within a scope of the present invention.

An installation groove 24 excavated in groove shape is provided on several locations of upper outer periphery of the upper member 20 for a nursery line on which seed or sprout of the seaweed S is planted to wind around the main body 10. At this time, even though the installation groove 24 is provided on several locations of the upper outer periphery of the upper member 20, not limited to this location, the installation groove 24 may be provided as a configuration for vertically connecting the upper member 20 and the lower member 30 and further it may be formed on the upper part of the through-hole 31, which are considered to fall within a scope of the present invention.

In addition, a first horizontal elongated groove 25 is provided on outer periphery of the upper member 20 for harmful organisms such as starfish, sea urchin and conch not to come over the upper member 20 and take the seaweed S attached to and inhabited thereof. At this time, even the first horizontal elongated groove 25 is formed in a rectangular elongated shape, as shown in the drawings, more than one of the first horizontal elongated groove may be formed, connecting horizontally the outer periphery of the upper member 20.

Meanwhile, more than one of a second groove 33 formed in a "vee shape" may be formed on the entire circumference of the outer periphery of the lower member 30, preventing the harmful organisms from coming over the upper member 20.

Here, the implanting body 40 may be formed in a circular shape corresponding to the detachment groove 23 so that the lower part of the implanting body 40 is detachably connected to the detachment groove 23 formed on the inclined surface 21 of the upper member 20, as described above. At this time, as aforementioned, the shape of the implanting body 40 may be adopted as various shapes such as an ellipse or polygon so long as they corresponded to the shapes of the detachment groove 23.

On both sides of the outer periphery of the implanting body 40 each recess groove 42 is formed, respectively wherein the recess groove 42 is formed on protruded upward on outer periphery when the implanting body 40 is connected to the detachment groove 23 so that the implanting body 40 is easily assembled or disassembled to the detachment groove 23 using the recessed groove 42 in relation to hemispherical shape of the implanting body. That is, the implanting body 40 may be assembled or disassembled to the detachment groove 23 using a tool (not shown) for grasping the recessed groove 42 formed on both sides of the protruded part of the implanting body 40. At this time, even though the upper part of the implanting body 40 is formed in a hemispherical shape, it may not be limited to this configuration, and further the shape of the recessed groove 42 may vary and thus shape variations of the upper part of the implanting body 40 and the recessed groove 42 for facilitating detachment are considered to fall within a scope of the present invention.

Furthermore, a vertical through opening 41 may be formed on a center of the implanting body 40 so that the implanting body 40 may be laminated and transported easily using the vertical through opening 41 and further damages to the implanting body may be avoided when it is cured and stored through the vertical through opening 41. That is, a plurality of the implanting bodies 40 is inserted in sequence around an elongated bar (not shown) using the vertical through opening 41 and then the plurality of the implanting bodies 40 may be handled easily for storage or movement.

Here, the main body 10 and the implanting body 40 are made of porous concrete wherein the porous concrete is made by mixing broken stone (gravel), zeolite and concrete with void percentage of 10-30%. At this time, the void percentage may be preferably greater than 25%. The porous concrete is commonly called Porous Concrete Cobble (it may also be called a "Porous Cobble"), referred to as a porous gravel conglomerate. The porous concrete cobble is generally provided with continuous void property and high efficiency of surface property wherein the continuous void (void percentage) ranges from 10-30% and a void diameter thereof is 5 mm or less. Accordingly, the porous concrete cobble has prominent water permeability and air permeability beneficial for environment and thus has various functions such as water purification function, reproduction function and water control function, etc. At this time, contaminants may be filtered through the void percentage of the porous concrete cobble, benefiting water purification.

Meanwhile, reproductive spaces proper for various seaweed are provided on the porous concrete cobble pursuant to the void and surface properties and thus seaweed may root through voids within the porous concrete cobble for surface soil and shore to be bonded strongly, harmonizing with the ecosystem and implementing the artificial ground reef 1.

Here, the porous concrete, general concrete and natural stone are compared as follows:

| Comparison Item | Porous concrete | General concrete | Natural stone |
|---|---|---|---|
| Water purification function | Excellent | None | Small |
| Reproductive function | Excellent due to void structure | Impossible | A few cases |
| Effect on ecosystem | Reproduction is vigorous and small life, fish and seaweed are easily planted. | Habitat is limited due to poison after installment. | Habitat is possible, but much damage to natural environment for collecting stones |
| Water permeability | Excellent | None | Small between gaps |
| Efficiency | Saves cost without iron bar | Long time period for installation | High cost for processing after collecting |

As shown in the comparison table, the porous concrete has excellent water purification function, reproductive function and water permeability and further is low poisonous and inexpensive. Accordingly, the artificial ground reef 1 may preferably be made of porous concrete rather than general concrete or natural stone, since reproduction is vigorous and further small life, fish and seaweed S can be planted easily thereto. Additionally, the zeolite has prominent advantages of water purification and reproduction effect, benefiting further water purification.

Accordingly, as the main body 10 and the implanting body 40 are made of porous concrete cobble, seawater and air can permeate easily and seaweed S and fish and shellfish can attach thereto, spawn and inhabit easily thereon, and further microorganisms may inhabit the voids. Here, the metabolism of the microorganisms can resolve harmful substances and water may be purified from natural plant coin-effect, and further offshore farming may be implemented within a short time period since seaweed S may be attached and inhabited thereon within a few days after the artificial ground reef is arranged on the sea floor surface L.

Figure 5A:
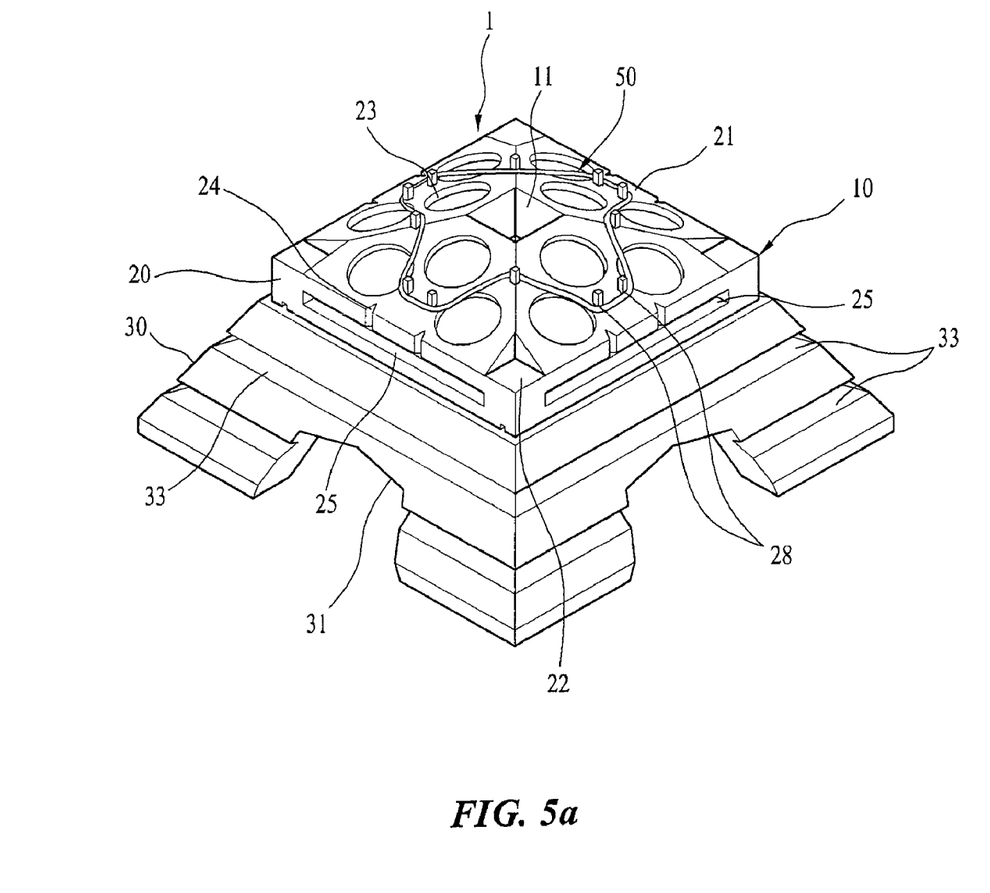
FIGS. 5a and 5b are perspective views showing respectively an artificial ground reef provided with nursery line according to one embodiment of the present invention.
Figure 5B:
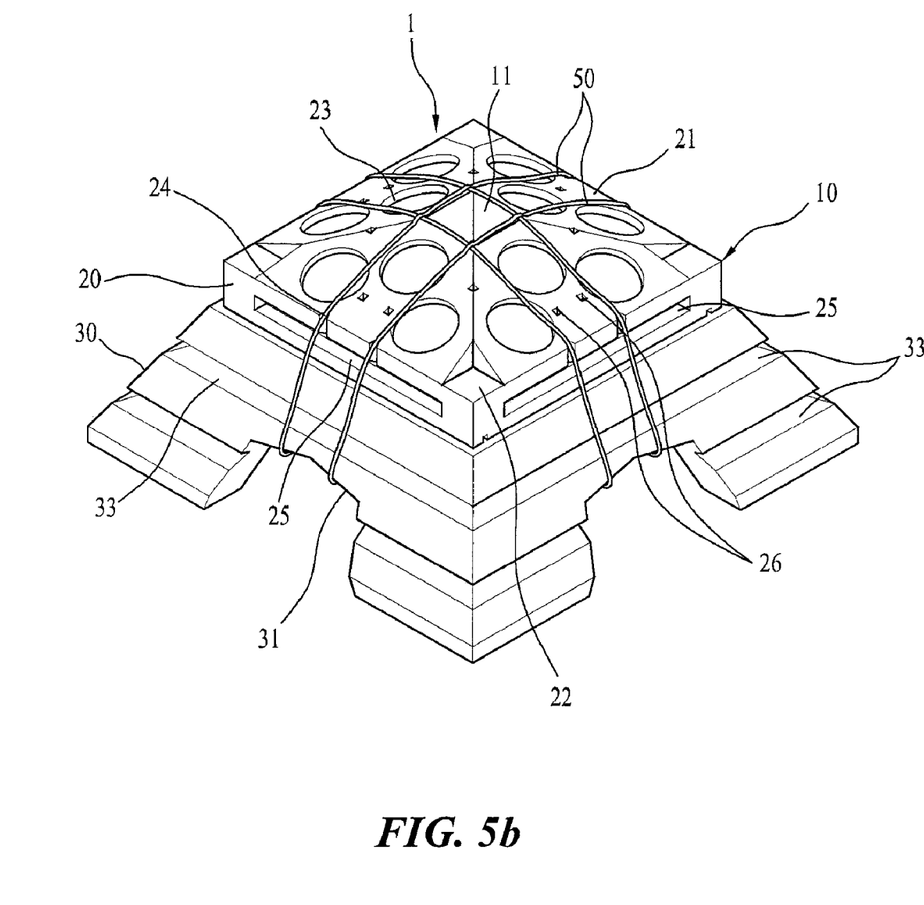

FIGS. 5a and 5b show an artificial ground reef provided with a nursery line. In the drawings, the artificial ground reef 1 is shown without the implanting body 40 for illustrative purpose of the nursery line 50 being wound, however, it has to be understood that the nursery line 50 may be provided with the implanting body 40 being connected to the detachment groove 23.

As shown in FIGS. 5a and 5b, when the main body 10 is arranged on a place where seaweed S is not easily implanted or more rapid implantation of seaweed is required, the nursery line 50 into which seed or sprout of seaweed S is attached is wound around the main body 10 and fixed thereto. In FIG. 5a, several bars 28 are provided for the nursery line 50 to be wound on a fixing groove 26 and the nursery line 50 is connected between the bars 28 and further in FIG. 5b, the nursery line 50 is arranged using a plurality of installation groove 24. At this time, as shown in FIG. 5b, when the nursery line 50 is arranged to wind firmly around the artificial ground reef using a plurality of installation groove 24 formed on the main body 10, the nursery line 50 may be fixed to the fixing groove 26 using a fixing unit (not shown) after the nursery line 50 is wound around the main body 10, preventing the nursery line 50 from being displaced due to high seas or tide direction. Additionally, a fixing groove 26 may be formed on several locations of outer periphery of the main body 10, not shown in the drawings, for the nursery line 50 to be fixed firmly to the main body 10.

Meanwhile, the nursery line 50 may be arranged on the main body 10 through the through-opening 11, and as shown in FIG. 5b, the nursery line 50 does not need to be arranged in parallel, and the nursery lines may be arranged offset. That is, the nursery lines 50 may be arranged on the main body 10 in various forms depending on condition or environment of arrangement, or operator's convenience.

Figure 6:
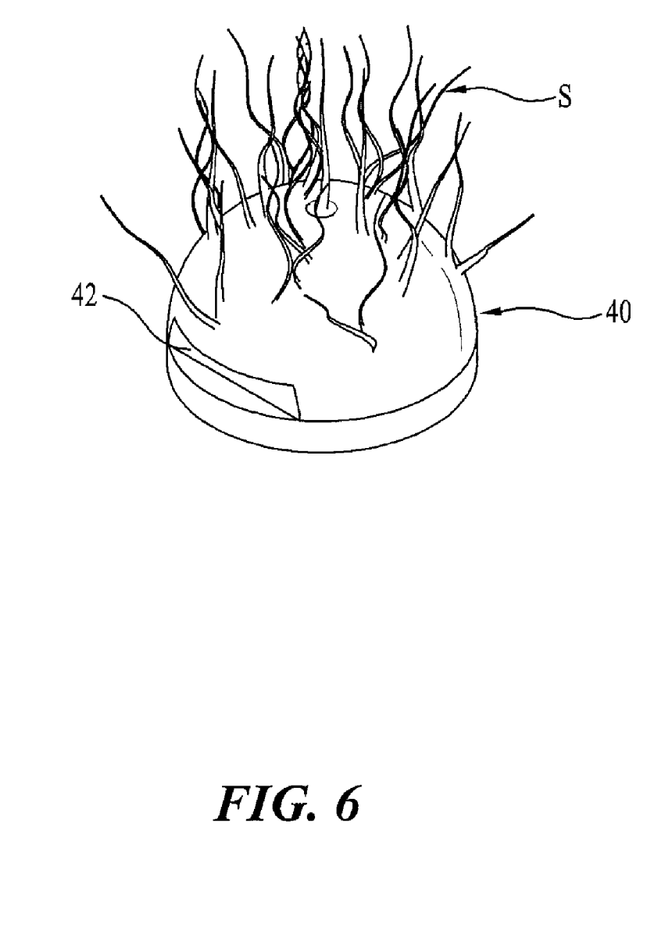
FIG. 6 is a perspective view showing an implanting body prior to an implanting according to one embodiment of the present invention.
Figure 7:
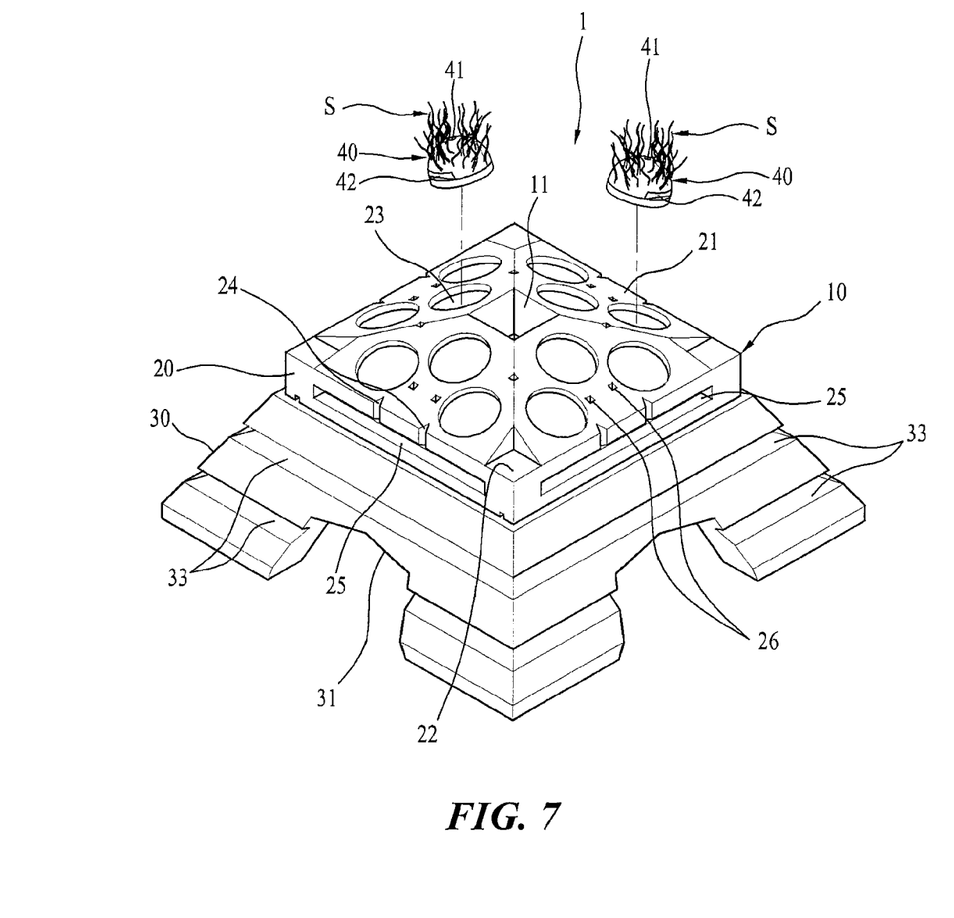
FIG. 7 is a perspective view showing an implanting state of seaweed to the artificial ground reef using the implanting body.

FIG. 6 is a perspective view showing the implanting body prior to arrangement on the main body and FIG. 7 is a perspective view showing states of arranging the implanting body on the main body.

As shown in FIGS. 6 and 7, the implanting body 40 is arranged on the upper part of the main body 10 and then the main body 10 provided with the implanting body 40 is placed on sea floor surface L. Under these circumstances, seaweed S is attached to and inhabiting on the main body 10 and the implanting body 40 and then the implanting body 40 is separated from the main body 10 and placed on sea floor surface L where seaweed S is necessary. At this time, the implanting body 40 in a state of shown in FIG. 6 may be arranged on other places wherein only the implanting body 40 may be placed on the sea floor surface L. In other words, when the implanting body 40 is arranged on sea floor surface L where seaweed S is necessary, firstly the main body 10 is arranged on a place where seaweed S is necessary and then the implanting bodies 40 on which seaweed S is attached and inhabiting is connected to the main bodies 10, restoring under sea ecosystem.

Referring to the artificial ground reef 1 as configured in aforementioned manner, more than one of the main body 10 are arranged in predetermined locations of the sea floor surface L in which the artificial ground reef 1 will be arranged. At this time, a plurality of implanting bodies 40 has been arranged on an upper part of the main body 10. Here, when seed or sprout of seaweed S flowing along tide passes around the main body 10 and the implanting body 40 which are arranged on sea floor surface L, made of porous concrete, and then is attached and thus inhabiting on outer faces of the main body 10 and the implanting body 40. After a predetermined time period has passed, many seaweed S inhabit on the outer faces of the main body 10 and the implanting body 40, the implanting body 40 is departed from the main body 10 and then the departed implanting body 40 may be arranged in other places where seaweed S is necessary. At this time, as shown in FIG. 6, only the implanting body 40 may be arranged on sea floor surface L, or as shown in FIG. 7, the implanting body 40 on which many seaweed S have been inhabited is connected to the main body 10 and then the main body 10 may be arranged on sea floor surface L.

Meanwhile, as seaweed S inhabit on a number of implanting bodies 40 connected to the main body 10, the number of implanting bodies 40 is separated from the main body 10 and then the respective implanting body 40 on which seaweed S is inhabited may be arranged in many locations, implementing offshore farming within short time period. That is, when twelve implanting bodies 40 are connected to one main body 10 and then seaweed S is attached and inhabited thereon, as shown in the drawings, twelve implanting bodies 40 are implanted. Furthermore, new twelve implanting bodies 40 are connected again to the aforementioned main body 10 and a procedure of seaweed S being attached and inhabited is repeated, implementing offshore farming within a short time period.

Here, only the upper member 20 of the main body 10 may be made of porous concrete and the lower member may be made of general concrete to save manufacturing cost, and further the main body 10 may be made of general concrete and only the implanting body 40 may be made of porous concrete. It has to be understood that these simple material variations all fall within a scope of the present invention.

While embodiments of the artificial ground reef according to the present invention are described referring to the preferred embodiments, the invention is not limited thereto, and thus various variations and modifications can be made without departing from a scope of the invention.

What is claimed is:

1. An artificial ground reef, comprising:
    a main body including an upper member and a lower member and provided with a plurality of through-holes on a lower part of the lower member, through which seawater may flow in all directions;
    an implanting body that is detachably connected to an upper face of the upper member, wherein the upper face of the upper member includes a detachment groove formed in a plurality of locations of the upper face of the upper member in a circular shape and an upper flat surface for lamination provided on a plurality of locations of an upper outer periphery of the upper member;
    the lower member includes a lower flat surface for lamination, corresponding to the upper flat surface for lamination, formed on a plurality of locations of an upper inner periphery of the lower member, and more than one of a "vee shaped" groove formed on an entirely horizontal circumference of the outer periphery of the lower member; and
    the implanting body formed in a hemispherical shape, a lower part of which is detachably connected to the detachment groove, and includes a recessed groove formed on both sides of an outer periphery of the implanting body and a through-opening formed vertically through a center of the implanting body, wherein the main body and the implanting body are made of porous concrete.

2. The artificial ground reef according to claim 1, wherein the porous concrete is made by mixing broken stone (gravel), zeolite and cement in a void percentage range of 10-30 percent.

3. The artificial ground reef according to claim 1, wherein the upper face of the upper member is inclined convexly toward the inner center of the upper member.

4. The artificial ground reef according to claim 1, wherein the upper member includes at least more than one of an elongated groove formed horizontally on an outer periphery of the upper member.

5. The artificial ground reef according to claim 1, wherein the main body includes more than one fixing groove to fix a bar for winding nursery line.

6. The artificial ground reef according to claim 1, wherein the main body includes a through-hole formed vertically through a center of the main body.

7. An artificial ground reef, comprising:
    a main body, including:
        an upper member having a plurality of detachment grooves and a plurality of upper flat surfaces, and
        a lower member having a plurality of through-holes and a plurality of lower flat surfaces;
    a plurality of "vee shaped" grooves formed horizontally along the entire circumference of the lower member;
    an implanting body made of porous concrete having a hemispherical shape and detachably connected to the upper member within the detachment grooves; and
    a recessed groove formed on an outer periphery of the implanting body.

8. The artificial ground reef of claim 7, wherein the porous concrete includes gravel, zeolite, and cement, and has a void percentage range of 10-30 percent.

9. The artificial ground reef of claim 7, wherein the upper member has an inclined surface.

10. The artificial ground reef of claim 7, further including an elongated groove formed horizontally along the periphery of the upper member.

11. The artificial ground reef of claim 7, further including a plurality of fixing grooves and a plurality of bars formed in the main body for winding a nursery line.

12. The artificial ground reef of claim 7, further including a through-hole formed vertically through a center of the main body.

* * * * *